United States Patent
Casper

(10) Patent No.: US 7,671,134 B2
(45) Date of Patent: Mar. 2, 2010

(54) COMPOSITIONS WITH IMPROVED ADHESION TO LOW SURFACE ENERGY SUBSTRATES

(75) Inventor: Daniel J. Casper, Hartford, WI (US)

(73) Assignee: Brady Worldwide, Inc., Milwaukee, WI (US)

(*) Notice: Subject to any disclaimer, the term of this patent is extended or adjusted under 35 U.S.C. 154(b) by 717 days.

(21) Appl. No.: 11/560,004

(22) Filed: Nov. 15, 2006

(65) Prior Publication Data

US 2008/0113094 A1    May 15, 2008

(51) Int. Cl.
C08L 9/00 (2006.01)
C08L 33/02 (2006.01)
C08L 33/04 (2006.01)
C08L 35/02 (2006.01)
C08G 18/42 (2006.01)
C08K 5/00 (2006.01)
B32B 7/12 (2006.01)
B32B 27/00 (2006.01)

(52) U.S. Cl. .................. 525/221; 525/222; 525/232; 524/500; 524/515; 524/522; 524/523; 156/327; 156/332

(58) Field of Classification Search .............. 525/221, 525/22, 232; 524/500, 515, 522, 523; 156/327, 156/332
See application file for complete search history.

(56) References Cited

U.S. PATENT DOCUMENTS

| 4,152,309 | A | * | 5/1979 | Ijichi et al. ................ 524/145 |
| 5,578,683 | A | * | 11/1996 | Koch et al. ................ 525/301 |
| 5,625,005 | A | | 4/1997 | Mallya et al. |
| 6,608,143 | B1 | * | 8/2003 | Fukuoka et al. ............ 525/309 |
| 6,747,097 | B2 | | 6/2004 | Chao et al. |
| 6,864,321 | B2 | | 3/2005 | Chao et al. |
| 2006/0084715 | A1 | | 4/2006 | Fechter et al. |

* cited by examiner

*Primary Examiner*—Nathan M Nutter
(74) *Attorney, Agent, or Firm*—Whyte Hirschboeck Dudek SC

(57) ABSTRACT

Acrylic-based pressure sensitive adhesives are modified with a telechelic hydrocarbon oligomer. The oligomer comprises a hydrocarbon polymer chain or backbone and a functional end group, e.g., an oligomer prepared from a mono hydroxyl polybutadiene polymer and toluene diisocyanate. The oligomer attaches to the acrylic backbone of the polymer as a pendant group and in a preferred embodiment, the oligomer is mixed with the PSA shortly before the PSA is coated.

10 Claims, No Drawings

COMPOSITIONS WITH IMPROVED ADHESION TO LOW SURFACE ENERGY SUBSTRATES

FIELD OF THE INVENTION

This invention relates to adhesive compositions. In one aspect, the invention relates to acrylic pressure sensitive adhesive compositions while in another aspect, the invention relates to such compositions comprising telechelic compounds with improved adhesion to low surface energy substrates, e.g., nonpolar plastic films.

BACKGROUND OF THE INVENTION

The ability to adhere to low surface energy materials, e.g., materials with nonpolar surfaces such as polyethylene, polypropylene and other polyolefin films, is steadily increasing in importance due to the proliferation of such plastics in many components of manufactured products. While rubber-based pressure sensitive adhesive compositions (PSA compositions, or more simply PSA or PSAs) adhere well to low surface energy materials, these compositions often lack thermo-oxidative and ultra-violet (UV) light resistance. Acrylic-based PSA compositions, on the other hand, have excellent thermo-oxidative and UV light resistance and as such, their use has been widespread and growing. However, acrylic-based PSAs in general lack good adhesion to low surface energy substrates due to the relatively high degree of polarity in the acrylic backbone.

Conventional methods of improving the adhesion of acrylic-based PSAs to low surface energy materials include mixing the PSA with one or more tackifiers and/or plasticizers. Tackifiers are typically resins having a low molecular weight, e.g., between about 500 and about 3500 grams per mole (g/mol) weight average molecular weight (Mw), and a high glass transition temperature (Tg), e.g., above about 80 C, and they reinforce the PSA by lowering the modulus of the PSA. This, in turn, imparts a greater viscous flow to the PSA which, in turn, promotes higher bond strength between the PSA and its substrate.

The mixing of a PSA with a tackifier, however, is not without disadvantages. These include a reduction of high temperature, e.g., greater than about 150 C, cohesion, increased minimum temperature bonding, e.g., at least about 15 C, and a reduction of tack at low adhesive coating thicknesses, e.g., less than about 0.8 mil. The reduction of tack at low thickness is a result of the high Tg of the tackifiers which inhibits ready flow of the PSA at low thickness.

Plasticizers, while very efficient at promoting viscous flow, compromise the cohesive strength of the PSA, especially at elevated temperatures, e.g., above 60 C.

Other methods to promote PSA low surface energy adhesion include the incorporation of rubber-based macromers into the acrylic backbone of the PSA. See, for example, U.S. Pat. Nos. 5,625,005 and 5,578,683. While this method does improve the low surface energy adhesion of the PSA, the resulting acrylic-rubber based polymer still lacks good tack performance at low thicknesses. This means that tackifiers are still necessary and as noted above, the addition of a tackifier adversely impacts the high temperature cohesion of the PSA. Moreover, since the incorporation of the rubber must occur during the manufacture of the PSA, the flexibility to formulate a PSA composition at the point of application is lost.

SUMMARY OF THE INVENTION

In one embodiment of the invention, a PSA composition comprises (i) an acrylic-based PSA, and (ii) an adhesion-promoting amount of a telechelic hydrocarbon oligomer. In another embodiment, the telechelic hydrocarbon oligomer is attached as a pendant group to the acrylic backbone of the PSA polymer. In yet another embodiment, the telechelic hydrocarbon oligomer is mixed with the acrylic-based PSA shortly before the PSA is applied to a substrate. In still another embodiment, the PSA composition comprises (i) an acrylic-based PSA, (ii) an adhesion-promoting amount of a telechelic hydrocarbon oligomer, and (iii) a tackifier and/or a plasticizer.

The PSA compositions of this invention exhibit not only good low surface energy adhesion, but they usually also exhibit at least one of good adhesion at low thicknesses, good high temperature cohesive strength, and formulation flexibility at the point of application. Regarding the formulation flexibility, this attribute of the invention allows more control over the physical properties of the PSA composition, including the amount of telechelic hydrocarbon oligomer incorporated into the composition, than is available from incorporating the oligomer directly into the backbone of the acrylic-based PSA (which must occur at the time the PSA is manufactured).

DESCRIPTION OF THE PREFERRED EMBODIMENTS

"Adhesive" means any substance, inorganic or organic, natural or synthetic, that is capable of bonding other substances together by surface attachment.

"Pressure-sensitive adhesive" or "PSA" means an adhesive that forms a bond simply by the application of light pressure to marry the adhesive to an adherend or substrate.

"PSA composition" means a PSA in combination with at least one other substance, e.g., a tackifier, plasticizer, antioxidant, pigment, etc. PSA compositions may include one or more solvents with the understanding that the solvent is lost, e.g., evaporated, at or after the time the PSA composition is applied to a substrate.

"Acrylic-based PSA" means a synthetic PSA comprising a polymer backbone that includes units derived from at least one alkyl acrylate or methacrylic ester, typically a $C_1$-$C_{14}$ alkyl acrylate or methacrylate ester. Examples of useful alkyl acrylate and (meth)acrylate esters containing 1-14 carbon atoms in the alkyl include methyl(meth)acrylate, ethyl acrylate, n-propyl(meth)acrylate, isopropyl(meth)acrylate, n-butyl(meth)acrylate, sec-butyl(meth)acrylate, t-butyl(meth)acrylate, cyclohexyl methacrylate, n-octyl(meth)acrylate, isooctyl acrylate, 2-ethylhexyl(meth)acrylate, isononyl acrylate and lauryl(meth)acrylate. Examples of other monomers that can be polymerized with the acrylate and methacrylate monomers include acrylic acid, methacrylic acid, itaconic acid, vinyl acetate, hydroxyalkylacrylate, acrylamide and methacrylamide. The acrylic-based PSA used in the practice of this invention contain sufficient functionality, e.g., a hydroxyl or carboxyl end group, to allow it to react with a functional group of the oligomer.

The acrylic-based PSAs used in the practice of this invention are known compounds and widely available. Representative PSAs include but are not limited to: Aroset™ 349M (a modified acrylic PSA available from Ashland Chemical Company), Aroset™ 1551 (a modified acrylic PSA also available from Ashland Chemical Company), Entrochem™ ECA238 (acrylic PSA available from Entrotech, Inc.), and BPS 5762 (a modified acrylic PSA available from Toyo Inc.).

The PSAs can be used alone or in combination with one or more additives to form a PSA composition. Typical additives include tackifiers, plasticizers, anti-oxidants, fillers, UV-inhibitors, pigments and the like. The PSA or PSA composition is usually carried in a solvent, e.g., a blend of ethyl acetate and toluene, but the solvent acts as a carrier for the PSA and it typically does not have any impact on the final properties of the PSA. These additives are used in known amounts and in known ways.

In the context of this invention, a tackifier is any substance that is added to an acrylic-based PSA to improve the initial and/or extended tack range of the PSA. Typically, the tackifiers used in the practice of this invention are hydrogenated or non-hydrogenated hydrocarbon and/or polyterpene resins. Representative of the optional tackifying agents are: Regalrez® 1126, Regalrez® 1018, Regalrez® 1033, Regalrez® 1065, Regalrez® 1078, Regalrez® 1094, Regalrez® 3102 and Regalrez.® 6108 (all tackifiers comprising one or more aliphatic or cycloaliphatic hydrocarbons available from Hercules Inc.); Kristalext® 3085, Kristalex® 3100, Kristalex® 1120, Kristalex® 5140, Endex® 155 and Endex® 160 (all tackifiers comprising one or more aliphatic or cycloaliphatic hydrocarbons in combination with one or more aromatic hydrocarbons, also available from Hercules Inc.); Nevchem® 140 (a crystalline terpene resin available from Neville Chemical Company), and Sylvatac® RE100LV (a disproportionated pentaerythritol rosin ester available from Arizona Chemical). If a tackifying agent is present, then Sylvatac® RE100LV is a preferred tackifying agent. The tackifier resins may be used alone or in combination with one another.

Preferably the PSA compositions of this invention do not include a processing oil, although any material that will facilitate processing and increase the flexibility and toughness of the adhesive can be used as an optional plasticizer in the PSA compositions of this invention. Typcially, these are nonvolatile organic liquids and low melting solids such as the phthalate, adipate and sebacate esters; polyols such as ethylene glycol and its derivatives; tricresol phosphate; and the like. If present in the PSA composition, then the mineral oil available from Witco Corporation under the trademark Kaydol® is a preferred plasticizer for use with the PSAs of this invention.

The telechelic hydrocarbon oligomer used in the practice of this invention is a low Mw polymer molecule comprising (i) a polymer chain or backbone comprising a small number of units derived from hydrocarbon or inertly-substituted hydrocarbon monomers containing ethylenic unsaturation, and (ii) a functional end group that is reactive with the backbone of an acrylic polymer. The polymer chain of the oligomer can contain branching, and it can be saturated or unsaturated. Typically and preferably the oligomer contains just one functional end group, and the group is reactive with the polymer chain under the conditions at which the PSA or PSA composition is applied to a substrate.

The hydrocarbon polymer chain or backbone of the oligomer is preferably saturated because saturated polymer chains typically are more stable to thermo-oxidation and UV light exposure than unsaturated polymer chains. Saturation can be imparted to the polymer chain either through monomer selection, e.g., ethylene, $C_{3-20}$ alpha-olefins, etc., or by hydrogenation of any unsaturation introduced into the polymer chain by monomer selection, e.g., monomers with two or more unsaturated groups such as a diene, triene, etc. Branching is also a function of monomer selection, e.g., alpha-olefins will introduce short-chain branching into the polymer backbone as will dienes when copolymerized with ethylene.

Inert substituents that can be present on the hydrocarbon backbone include any radical or group that is essentially nonreactive with the PSA or any other component of the PSA composition, the substrate and other oligomer molecules. "Essentially nonreactive" means that the radical or group will not react with the PSA, etc., to an extent that it will materially interfere with the reaction between the functional end of the oligomer and the PSA under the conditions that the PSA or PSA composition is applied to a substrate. Exemplary inert substituents that can be present on an oligomer polymer backbone include, other than short-chain branching resulting from monomer selection, but are not limited to, halogen, alkoxy, and similar groups.

The functional end group of the oligomer is any group that can react with the PSA acrylic-based backbone such that it attaches to the backbone as a pendant group. The oligomer does not incorporate itself into the backbone; rather it attaches as a pendant group from the backbone. Typical functional groups include those derived from diisocyanates, melamine, silanes, and the like.

The Mw of the telechelic hydrocarbon oligomer used in the practice of this invention is typically at least about 500, preferably at least about 1000 and more preferably at least about 1500, g/mol. The maximum Mw of the oligomer is limited only by practical considerations such as cost, processability, etc., but typically the Mw of the oligomer does not exceed about 5000, preferably it does not exceed about 3500 and more preferably it does not exceed about 2000, g/mol.

In one embodiment, the telechelic hydrocarbon oligomer is prepared by reacting a mono hydroxyl-functional polybutadiene with a stoichiometric amount of toluene diisocyanate. The oligomer is a clear, highly viscous liquid with an Mw of approximately 2000 g/mol (measured by ASTM D5296-05). The oligomer can be used with the unsaturation, or it can be first hydrogenated to remove the unsaturation to improve its thermo-oxidative and UV light stability. Functional groups derived from toluene diisocyanate are preferred because they easily react with the backbone of the acrylic polymer under ambient conditions, e.g., 23 C and atmospheric pressure, without the need for catalysts. These oligomers react with the acrylic-based polymer backbone through residual acrylic acid or hydroxyl-functional monomers incorporated into the PSA polymer backbone. The product from the reaction of the acrylic-based polymer backbone and oligomer is a comb-type copolymer.

The telechelic hydrocarbon oligomers of this invention are blended with the PSA or PSA composition in any conventional manner, typically and preferably shortly before the PSA is applied to a substrate to minimize any reaction between the PSA and oligomer before application of the PSA to the substrate. Reaction between the PSA and oligomer before application of the PSA composition to the substrate can result in unwanted thickening of the PSA composition and thus a possible reduction in its ability to wet the substrate which in turn can result in thicker coatings than necessary or desired. Preferably, the reaction between the PSA and oligomer occurs during and after the PSA composition is or has been applied to the substrate. The PSA composition can be applied to the substrate in any convenient manner, e.g., reverse roll, slot die, gravure or Meyer rod.

The amount of oligomer added to the PSA or PSA composition can vary widely, but typically the minimum amount of oligomer added to the PSA or PSA composition is at least about 2, preferably at least about 5 and more preferably at least about 10, weight percent (wt %) based on the weight of the PSA or PSA composition (less any solvent that may be present). The maximum amount of oligomer added to the PSA or PSA composition is a matter of practical considerations such as cost and ability of the oligomer to attach to the acrylic-based polymer backbone, but typically the maximum amount of oligomer does not exceed about 25, preferably it does not exceed about 20 and more preferably it does not exceed about 15, wt % based on the weight of the PSA or PSA composition (less any solvent that may be present).

The following examples are illustrative embodiments of the invention. Unless otherwise noted, all parts and percentages are by weight.

SPECIFIC EMBODIMENTS

The telechelic hydrocarbon oligomer used in these examples was the reaction product of an unsaturated polybutadiene of 2000 g/mol Mw and toluene diisocyanate. It was diluted in toluene and ethyl acetate (50:50) to 35% solids before it was incorporated into the various adhesive systems described below.

Example 1

The oligomer solution was added to a mixture of Ashland's Aroset 349M and Entrochem ECA238 (90:10 on a dry weight basis). The mixture of Aroset 349M and Entrochem ECA238 is coated and dried to obtain a 37 micron (1.5 mil) thick double-coated tape, where 12.5 micron (0.5 mil) of adhesive is coated on both sides of 12.5 micron polyester film. While this example has good adhesion to surfaces like stainless steel, it lacks adhesion to surfaces like polypropylene. The oligomer was added to the adhesive and then coated onto 2 mil polyester film to a thickness of approximately 12.5 micron (0.5 mil). The samples were dried in a forced air oven for 5 minutes at 150 C. After coating samples were tested for adhesion to stainless steel and polypropylene, Polyken probe tack (ASTM 2979 with one second dwell), and cohesive strength via shear adhesion failure temperature (SAFT) measurement (ASTM 4498-95).

TABLE 1

Sample Formulations

| | A | B | C | D | E |
|---|---|---|---|---|---|
| Aroset 349M | 35 g | 35 g | 35 g | 35 g | 35 g |
| Entrochem ECA238 | 3.89 g | 3.89 g | 3.89 g | 3.89 g | 3.89 g |
| 35% Soln of Oligomer | 0 g | 2.00 g | 4.00 g | 6.00 g | 8.00 g |
| % Oligomer (based on PSA solids) | 0% Cntrl | 5% | 10% | 15% | 20% |

TABLE 2

Sample Performance

| | A | B | C | D | E |
|---|---|---|---|---|---|
| Adhesion to SS (20 min dwell) Average (oz/in) | 59.40 | 64.88 | 55.30 | 53.80 | 35.58 |
| Adh to SS (72 hrs @ RT) Average (oz/in) | 71.46 | 65.75 | 58.83 | 52.61 | 38.67 |
| Adhesion to PP (20 min dwell) Average (oz/in) | 3.00z | 5.47z | 11.67z | 32.00 | 21.79 |
| Adh to PP (72 hrs @ RT) Average (oz/in) | 36.53 | 31.58 | 40.08 | 43.23 | 25.80 |
| Tack Average (g) | 617 | 634 | 889 | 831 | 660 |
| S.A.F.T. (1" × 1" × 1 kg) Average(° C.) | 171 | 197 | 200 | 200 | 149 |

Z = Zippy

Adhesion measurements are made according to ASTM D1000, and the tack and SAFT measurements are made by the ASTM methods described above. The addition of the oligomer resulted in lower adhesion to stainless steel, with an increase in adhesion to polypropylene. Zippy adhesion (i.e., the popping off and then grabbing of an adhesive tape during removal leading to an overall "zippy", i.e., non-smooth, release from the surface to which it had been adhered) is more properly referred as slip-stick release from a substrate. In the ease of the control sample "A", the slip-stick adhesion is due the lack of adhesion to polypropylene in combination with the stiffness of the backing material. Addition of the oligomer helps promote quick wetting of low surface energy (LSE) surfaces, e.g., thermoplastic polyolefins such as polyethylene or polypropylene, and eliminates zippy release at levels greater than 10%. The increase in Polyken probe tack is likely due to the increase in viscous flow that addition of the telechelic oligomer allows. Sample E also clearly shows that excessive amounts of oligomer added lead to lower adhesions, tack and shear strength. Sample E contains oligomer that could not react with the acrylic backbone, and this excess oligomer acted as a plasticizer. The increase in SAFT from sample A through sample D is likely due to higher entanglement of the polymer network that the addition of the oligomer created, thus restricting viscous flow even at elevated temperatures.

Example 2

The oligomer was added to Ashland Aroset 1551 and Toyo BPS 5762 adhesive. Both of these adhesives are tackified acrylic PSAs which have moderate adhesion to polypropylene. The objective of adding the oligomer is to further increase adhesion to LSE materials. Due to the fact that both adhesives contain tackifiers, we evaluated these materials at thicknesses of 25 micron (μm) and 50 μm.

TABLE 3

Sample Formulations

| | Toyo BPS 5762 | A | B | C | D | E |
|---|---|---|---|---|---|---|
| Toyo BPS 5762 | 35 g | 35 g | 35 g | 35 g | | |
| Toyo BXX5627 | 0.49 g | 0.49 g | 0.49 g | 0.49 g | | |
| Ashland Aroset 1551 | | | | | 35 g | 35 g |
| 35% Soln of Oligomer | 0 g | 2.25 g | 4.50 g | 6.75 g | 2.25 g | 4.50 g |
| % Oligomer* | 0 | 5 | 10 | 15 | 5 | 10 |

*Based on PSA solids.

TABLE 4-A

Sample Performance - 1.0 mil Thickness

| | Aroset 1551 1.0 mil | BPS 5762 1.0 mil | A | B | C | D | E |
|---|---|---|---|---|---|---|---|
| Adhesion to SS (20 min dwell) | | | | | | | |
| Average (oz/in) | 54.43 | 47.75 | 58.39 | 56.74 | 52.89 | 71.54 | 64.66 |
| Adh to SS (72 hrs @ RT) | | | | | | | |
| Average (oz/in) | 88.26 | | 70.76 | 63.21 | 59.35 | 83.18 | 76.17 |
| Adhesion to PP (20 min dwell) | | | | | | | |
| Average (oz/in) | 35.95 z | 35.58 | 55.45 | 51.82 | 46.43 | 56.57 | 43.79 |
| Adh to PP (72 hrs @ RT) | | | | | | | |
| Average (oz/in) | 59.45 z | | 57.39 | 48.96 | 45.17 | 58.40 | 39.9 z |
| Tack | | | | | | | |
| Average (g) | 1020 | 852 | 1324 | 1452 | 1691 | 1515 | 1348 |
| S.A.F.T. (1" × 1" × 1 kg) | | | | | | | |
| Average (° C.) | 200+ | 196 | 200+ | 200+ | 200+ | 200+ | 200+ |

Z = Zippy

TABLE 4-B

Sample Performance - 2.0 mil Thickness

| | Aroset 1551 2.0 mil | BPS 5762 2.0 mil | A | B | C | D | E |
|---|---|---|---|---|---|---|---|
| Adhesion to SS (20 min dwell) | | | | | | | |
| Average (oz/in) | 46.07 | 48.869 | 80.91 | 73.37 | 75.20 | 79.66 | 74.27 |
| Adh to SS (72 hrs @ RT) | | | | | | | |
| Average (oz/in) | 78.41 | | 81.87 | 77.71 | 79.26 | 90.04 | 87.57 |
| Adhesion to PP (20 min dwell) | | | | | | | |
| Average (oz/in) | 56.94 | | 69.01 | 60.18 | 58.96 | 65.06 | 60.60 |
| Adh to PP (72 hrs @ RT) | | | | | | | |
| Average (oz/in) | 69.07 | | 69.38 | 58.27 | 47.42 | 65.94 | 62.31 |
| Tack | | | | | | | |
| Average (g) | 1698 | 1030 | 1911 | 1720 | 1593 | 1802 | 1962 |
| S.A.F.T. (1" × 1" × 1 kg) | | | | | | | |
| Average (° C.) | 200+ | | 200+ | 200+ | 200+ | 200+ | 200+ |

Addition of the oligomer to Aroset 1551 improved the initial adhesion of stainless steel and polypropylene to levels close to Aroset's 1551 72 hour adhesion level. As with Example 1, addition of the oligomer not only lowers the surface energy of the adhesive, but increases viscous flow, thus allowing quicker wetting of substrates. Also, since both Aroset 1551 and Toyo BPS5762 are tackified systems, the optimal level of the oligomer is much lower than in Example 1 in which no tackifiers were used.

Table 5 and 6 are summary reports comparing adhesives formulated with the oligomer to known industry benchmarks. The adhesives with the oligomer exhibit superior adhesion than the benchmark adhesives.

TABLE 5

Adhesive Comparison at 12.5 µm Adhesive Thickness on 50.8 µm PET

|  | Aroset 1551 | DuroTac 80-115A | 3M 3019 | BA2037 | Aroset 1551 w/ 5% Oligomer | BA2037 w/15% Oligomer |
|---|---|---|---|---|---|---|
| Adhesive Type | Tackified acrylic | Rubber-acrylic hybrid tackified | Tackified acrylic (44 µm PSA thickness) | Acrylic adhesive | Tackified acrylic PSA with 5% Oligomer | Acrylic adhesive with 15% Oligomer |
| Adhesion to SS (20 min) | 38.9 oz/in | 48.8 oz/in | 36.2 oz/in | 59.4 oz/in | 65.0 oz/in | 53.8 oz/in |
| Adhesion to SS (72 hrs) | 74.2 oz/in |  | 40.2 oz/in | 71.5 oz/in | 72.3 oz/in | 52.6 oz/in |
| Adhesion to PP (20 min) | 17.0 oz/in Zippy | 27.0 oz/in | 36.4 oz/in | 3.0 oz/in Zippy | 45.3 oz/in | 32.0 oz/in |
| Adhesion to PP (72 hrs) | 52.7 oz/in |  | 35.5 oz/in | 36.5 oz/in | 45.8 oz/in | 43.2 oz/in |
| Tack | 636 g | 283 g | 712 g | 617 g | 885 g | 831 g |
| SAFT | >200° C. | 150° C. | 52° C. | 171° C. | >200° C. | >200° C. |

TABLE 6

Adhesive Comparison at 50.8 µm Adhesive Thickness on 50.8 µm PET

|  | 3M 8132LE | Durolack 80-115A | Nitto 5015P | Aroset 1551 | Aroset 1551 w/5% Oligomer |
|---|---|---|---|---|---|
| Adhesive Type | Tackified acrylic | Rubber-acrylic hybrid tackified | Tackified acrylic (44 µm PSA thickness) | Tackified acrylic | Tackified acrylic w/5% Oligomer |
| Adhesion to SS (20 min) | 78.4 oz/in | 44.5 oz/in | 85.9 oz/in | 46.1 oz/in | 80.0 oz/in |
| Adhesion to SS (72 hrs) | 95.0 oz/in | 55.3 oz/in | 100.9 oz/in | 78.4 oz/in | 90.0 oz/in |
| Adhesion to PP (20 min) | 67.5 oz/in | 54.5 oz/in | 64.1 oz/in | 56.9 oz/in | 65.1 oz/in |
| Adhesion to PP (72 hrs) | 92.8 oz/in | 59.2 oz/in | 83.6 oz/in | 69.1 oz/in | 66.0 oz/in |
| Tack | 1947 g | 1400 g | 1987 g | 1698 g | 1802 g |
| SAFT | 165° C. | 150° C. | 127° C. | >200° C. | >200° C. |

Tables 5 and 6 show that addition of the reactive oligomer not only improve tack and adhesion, but it does so while maintaining high cohesive strength. Moreover, these examples demonstrate that existing PSAs (which sacrifice a balance of properties to obtain high adhesion to low surface energy surfaces) can be further improved by addition of the reactive oligomer.

Although the invention has been described in considerable detail by the preceding examples, this detail is for the purpose of illustration. Many modifications and variations can be made on the invention without departing from the spirit and scope of the invention as it is described in the appended claims. All U.S. patents and published patent applications identified above are incorporated herein by reference.

What is claimed is:

1. A pressure sensitive adhesive (PSA) composition comprising (i) a PSA with an acrylic-based polymer backbone, and (ii) an adhesion-promoting amount of a telechelic oligomer comprising a polymer backbone comprising units derived from butadiene and a functional end group derived from a diisocyanate.

2. The composition of claim 1 in which the polymer backbone of the PSA comprises units derived from an alkyl methacrylate.

3. The composition of claim 1 in which the polymer backbone of the PSA comprises units derived from at least one of acrylic acid and a hydroxy-functional monomer.

4. The composition of claim 1 in which the functional end group is derived from toluene diisocyanate.

5. The composition of claim 1 in which the adhesion-promoting amount of the oligomer is between about 5 and about 25 weight percent based on the weight of the composition.

6. The composition of claim 1 in which the at least a portion of the oligomer is attached as a pendant group to the polymer backbone of the PSA.

7. The composition of claim 1 further comprising a tackifier.

8. The composition of claim 7 further comprising at least one of a plasticizer, anti-oxidant, pigment and UV-inhibitor.

9. The composition of claim 4 in which the polymer backbone or the oligomer is saturated.

10. The composition of claim 3 in which the hydroxy-functional monomer is hydroxy methyl methacrylate.

* * * * *

UNITED STATES PATENT AND TRADEMARK OFFICE
CERTIFICATE OF CORRECTION

PATENT NO.       : 7,671,134 B2
APPLICATION NO.  : 11/560004
DATED            : March 2, 2010
INVENTOR(S)      : Daniel J. Casper It is certified that error appears in the above-identified patent and that said Letters Patent is hereby corrected as shown below:

In the specification, Col. 8, should read

Table 4-B

Sample Performance – 2.0 mil Thickness

|  | Aroset 1551 | BPS 5762 | | | | | |
|---|---|---|---|---|---|---|---|
|  | 2.0 mil | 2.0 mil | A | B | C | D | E |
| Adhesion to SS (20min dwell) | | | | | | | |
| Average (oz/in) | 46.07 | 48.889 | 80.91 | 73.37 | 75.20 | 79.66 | 74.27 |
| Adh to SS (72hrs @ RT) | | | | | | | |
| Average (oz/in) | 78.41 | | 81.87 | 77.71 | 79.26 | 90.04 | 87.57 |
| Adhesion to PP (20min dwell) | | | | | | | |
| Average (oz/in) | 56.94 | | 69.01 | 60.18 | 56.96 | 65.06 | 60.60 |
| Adh to PP (72hrs @ RT) | | | | | | | |
| Average (oz/in) | 69.07 | | 69.38 | 58.27 | 47.42 | 65.94 | 62.31 |
| Tack | | | | | | | |
| Average (g) | 1698 | 1030 | 1911 | 1720 | 1593 | 1802 | 1962 |
| S.A.F.T. (1"X1"X1kg) | | | | | | | |
| Average (°C) | 200+ | | 200+ | 200+ | 200+ | 200+ | 200+ |

Col. 10, should read

Table 5

Adhesive Comparison at 12.5 μm Adhesive Thickness on 50.8 μm PET

|  | Aroset 1551 | DuroTac 80-115A | 3M 9019 | BA2037 | Aroset 1551 w/ 5% Oligomer | BA2037 w/15% Oligomer |
|---|---|---|---|---|---|---|
| Adhesive Type | Tackified acrylic | Rubber-acrylic hybrid tackified | Tackified acrylic (7.5 μm PSA thickness | Acrylic adhesive | Tackified acrylic PSA with 5% Oligomer | Acrylic adhesive with 15% Oligomer |
| Adhesion to SS (20min) | 38.9 oz/in | 48.8 oz/in | 36.2 oz/in | 59.4 oz/in | 65.0 oz/in | 53.8 oz/in |
| Adhesion to SS (72hrs) | 74.2 oz/in |  | 40.2 oz/in | 71.5 oz/in | 72.3 oz/in | 52.6 oz/in |
| Adhesion to PP (20min) | 17.0 oz/in Zippy | 27.0 oz/in | 36.4 oz/in | 3.0 oz/in Zippy | 45.3 oz/in | 32.0 oz/in |
| Adhesion to PP (72hrs) | 52.7 oz/in |  | 35.5 oz/in | 36.5 oz/in | 45.8 oz/in | 43.2 oz/in |
| Tack | 636g | 283g | 712g | 617g | 885g | 831g |
| SAFT | >200°C | 150°C | 52°C | 171°C | >200°C | >200°C |

Signed and Sealed this

Twentieth Day of April, 2010

David J. Kappos
*Director of the United States Patent and Trademark Office*